(12) United States Patent
Ma

(10) Patent No.: US 9,077,932 B2
(45) Date of Patent: Jul. 7, 2015

(54) MULTIMEDIA SYSTEM, RELEVANT MULTIMEDIA INFORMATION DISPLAY DEVICE AND MULTIMEDIA INFORMATION TRANSMISSION METHOD

(71) Applicant: Realtek Semiconductor Corp., Hsinchu (TW)

(72) Inventor: Chen Ma, San Jose, CA (US)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 153 days.

(21) Appl. No.: 13/857,704

(22) Filed: Apr. 5, 2013

(65) Prior Publication Data

US 2013/0265492 A1 Oct. 10, 2013

Related U.S. Application Data

(63) Continuation-in-part of application No. 13/624,582, filed on Sep. 21, 2012, now Pat. No. 8,755,670.

(60) Provisional application No. 61/620,988, filed on Apr. 6, 2012.

(30) Foreign Application Priority Data

Aug. 28, 2012 (TW) .............................. 101131261 A
Oct. 4, 2012 (TW) .............................. 101136764 A

(51) Int. Cl.
| | |
|---|---|
| *H04N 5/77* | (2006.01) |
| *H04N 5/445* | (2011.01) |
| *H04N 21/472* | (2011.01) |
| *H04N 21/4722* | (2011.01) |
| *H04N 21/81* | (2011.01) |

(52) U.S. Cl.
CPC ........... *H04N 5/445* (2013.01); *H04N 5/44543* (2013.01); *H04N 5/44591* (2013.01); *H04N 21/47217* (2013.01); *H04N 21/4722* (2013.01); *H04N 21/8133* (2013.01); *H04N 2005/44556* (2013.01)

(58) Field of Classification Search
None
See application file for complete search history.

(56) References Cited

U.S. PATENT DOCUMENTS

| | | | |
|---|---|---|---|
| 6,580,870 B1 | 6/2003 | Kanazawa et al. | |
| 8,437,605 B2 | 5/2013 | Cho et al. | |
| 2004/0150530 A1 | 8/2004 | Haruki | |
| 2011/0179383 A1 | 7/2011 | Morris | |
| 2012/0075334 A1* | 3/2012 | Pourbigharaz et al. | ....... 345/619 |

(Continued)

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

A multimedia system includes a multimedia content providing device, a multimedia information providing device, and a multimedia information display device. The multimedia content providing device and the multimedia information providing device respectively provide the multimedia content and the related multimedia information. The multimedia information display device comprises a display device, a wireless communication device, and a signal processing device. The wireless communication device receives the multimedia content and the related multimedia information. The signal processing device configures the display device to display the multimedia content and the related multimedia information synchronously. Moreover, the signal processing device may also configure a multimedia content display device to display the multimedia content and configure the display device of the multimedia information display device to synchronously display the related multimedia information.

13 Claims, 5 Drawing Sheets

(56) References Cited

U.S. PATENT DOCUMENTS

| | | |
|---|---|---|
| 2012/0144418 A1 | 6/2012 | Morris et al. |
| 2013/0027551 A1* | 1/2013 | Peleg et al. .................. 348/143 |
| 2013/0295893 A1 | 11/2013 | Roberts |
| 2014/0248034 A1* | 9/2014 | Tokutake ...................... 386/241 |

\* cited by examiner

MULTIMEDIA SYSTEM, RELEVANT MULTIMEDIA INFORMATION DISPLAY DEVICE AND MULTIMEDIA INFORMATION TRANSMISSION METHOD

CROSS-REFERENCE TO RELATED APPLICATIONS

This application claims the benefit of priority to U.S. Provisional Application Ser. No. 61/620,988, filed on Apr. 6, 2012. This application is a Continuation-In-Part of and claims the benefit of priority to U.S. patent application Ser. No. 13/624,582, filed on Sep. 21, 2012. This application claims the benefit of priority to Patent Application No. 101131261, filed in Taiwan on Aug. 28, 2012, and the benefit of priority to Patent Application No. 101136764, filed in Taiwan on Oct. 4, 2012. The entirety of the aforementioned applications is incorporated herein by reference for all purposes.

BACKGROUND

The disclosure generally relates to a multimedia system and, more particularly, to the multimedia system with a multimedia information display device.

Nowadays, diverse multimedia contents (e.g., news, soap operas, videos, pictures, and music) have already become an indispensable element of human life. Many people are used to obtaining the consuming information, the travel information, the educational information, etc. from the multimedia contents. For example, many people may be interested in the appliances, the scenes, the restaurants, or the costumes appeared in a movie.

Traditionally, the information is often presented in the form of television advertisements played between the programs. The television advertisements are usually very short because of the expensive cost, and the audiences are dazzled by the various television advertisements crammed in a short period of time. The information must be condensed to a slogan or a brief statement to reduce the advertising cost and draw the viewers' attention. Even though, the traditional television advertisements are getting more and more difficulties in catching the viewers' eyes.

Moreover, along with the prevalence of portable devices, people are gradually changing their viewing habits. Many people are used to spending more time viewing multimedia contents on the smart phone, the tablet computer, the notebook computer, or other portable devices. The traditional advertisements do not fit in these new types of multimedia delivery channels, and the advertising effects are greatly reduced.

Although people are no stranger to using the portable devices, they are still bothered when they need to watch the multimedia contents and search related multimedia information through the internet or other web resource at the same time. Not only is the viewing quality deteriorated, but also the multimedia information cannot be found accurately.

SUMMARY

In view of the foregoing, it may be appreciated that a substantial need exists for methods and apparatuses that mitigate or reduce the problems above.

An example embodiment of a multimedia system is disclosed, comprising: a multimedia content providing device, configured to operably transmit a multimedia content, wherein the multimedia content comprises a plurality of image frames; a multimedia information providing device, configured to operably transmit a multimedia information, wherein the multimedia information comprises a plurality of instances; and a multimedia information display device, comprising a display device, a wireless communication device, and a signal processing device; wherein the wireless communication device receives the multimedia content and the multimedia information; in a first interval, the signal processing device configures the display device to display a first image frame of the multimedia content, a first instance of the multimedia information, and a progress indicator indicating a first progress of displaying the first image frame; in a second interval, the signal processing device configures the display device to display a second image frame of the multimedia content, a second instance of the multimedia information, and the progress indicator indicating a second progress of displaying the second image frame; the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame.

Another example embodiment of a multimedia information display device is disclosed, comprising: a first display device; a wireless communication device, configured to operably receive a multimedia content and a multimedia information, wherein the multimedia content comprises a plurality of image frames, and the multimedia information comprises a plurality of instances; and a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame; wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame.

Another example embodiment of a multimedia information providing method is disclosed, comprising: transmitting a plurality of abstract information of multimedia contents to a multimedia information display device so that a first display device of the multimedia information display device displays a guide screen, wherein the guide screen comprises the abstract information of the multimedia contents; receiving a selection input signal corresponding to a first multimedia content of the multimedia content; configuring a multimedia content providing device to transmit the first multimedia content to the multimedia information display device according to the selection input signal, wherein the first multimedia content comprises a plurality of image frames; and providing a multimedia information to the multimedia information display device so that the first display device displays a first image frame of the first multimedia content, a first instance of the multimedia information, and a progress indicator indicating a first progress of displaying the first image frame in a first interval; and the first display device displays a second image frame of the first multimedia content, a second instance of the multimedia information, and the progress indicator indicating a second progress of displaying the second image frame in a second interval; wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame.

It is to be understood that both the foregoing general description and the following detailed description are examples and explanatory only and are not restrictive of the invention as claimed.

DETAILED DESCRIPTION

Reference is made in detail to embodiments of the invention, which are illustrated in the accompanying drawings.

Figure 1:
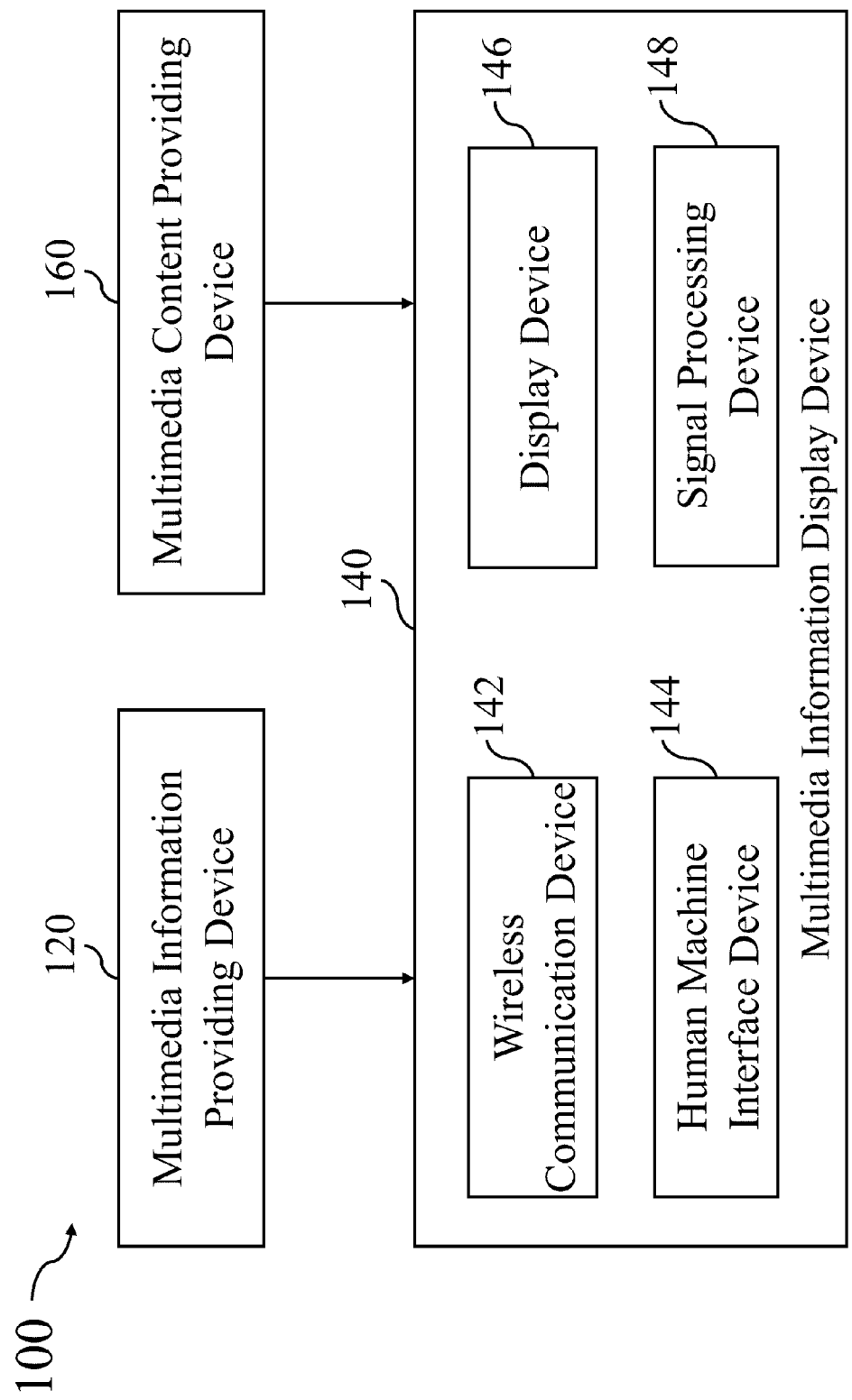
FIG. 1 shows a simplified functional block diagram of a multimedia system according to one embodiment of the present disclosure.

FIG. 1 shows a simplified functional block diagram of a multimedia system 100 according to one embodiment of the present disclosure. The multimedia system 100 comprises a multimedia information providing device 120, a multimedia information display device 140, and a multimedia content providing device 160.

The multimedia information providing device 120 may be realized with a cable television transmitting equipment, a broadcast television transmitting equipment, a multimedia web content transmitting equipment, or other suitable multimedia information providing equipment. The multimedia information providing device 120 may provide one or more multimedia information to the multimedia information display device 140 by utilizing a wired communication device and/or a wireless communication device (not shown in FIG. 1).

The multimedia information display device 140 comprises a wireless communication device 142, a human machine interface device 144, a display device 146, and a signal processing device 148. The multimedia information display device 140 may be realized with a tablet computer, a notebook computer, a mobile phone, or other suitable portable devices. The multimedia information display device 140 may receive the multimedia information transmitted from the multimedia information providing device 120 by utilizing the wireless communication device 142. The signal processing device 148 may configure the display device 146 to display the multimedia information. The human machine interface device 144 may be configured to operably receive a user's input, and may comprise a keyboard, a pointing device, a touchpad, etc.

The multimedia content providing device 160 may be realized with a cable television transmitting equipment, a broadcast television transmitting equipment, a multimedia web content transmitting equipment, or other suitable multimedia content providing equipment. The multimedia content providing device 160 may transmit the multimedia content to the multimedia information display device 140 by wired communications and/or wireless communications, so that the multimedia information display device 140 may display the multimedia content transmitted by the multimedia content providing device 160.

For the purposes of conciseness and clear explanation, some components and the connections thereof are omitted in FIG. 1. For example, the multimedia information 140 may further comprise an audio output device.

Figure 2:
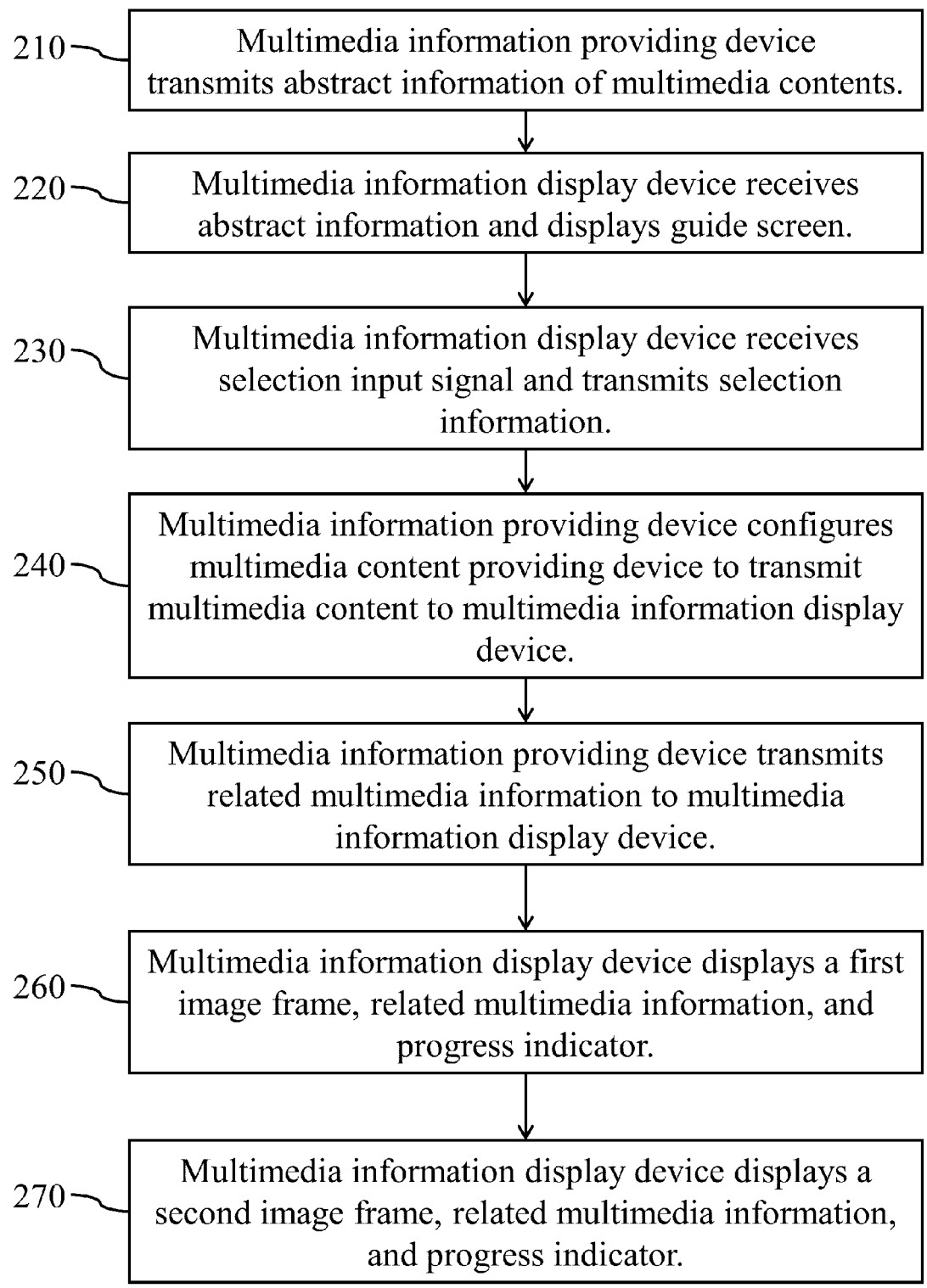
FIG. 2 shows a simplified flowchart of an operating method of the multimedia system in FIG. 1 according to one embodiment of the present disclosure.
Figure 3:
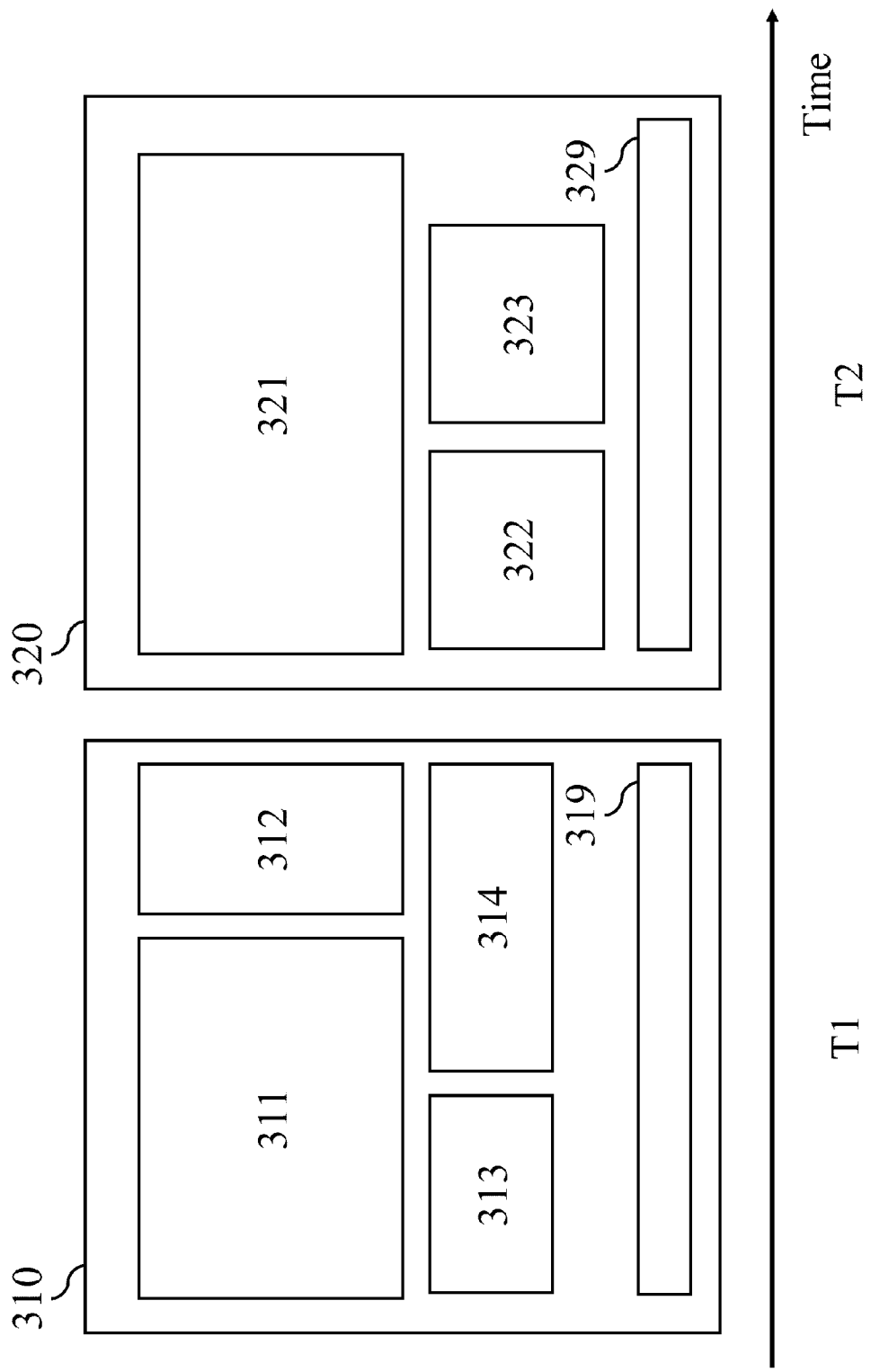
FIG. 3 shows a simplified timing diagram of the content displayed on the multimedia information display device in FIG. 1 according to one embodiment of the present disclosure.

FIG. 2 shows a simplified flowchart of an operating method of the multimedia system 100 according to one embodiment of the present disclosure. FIG. 3 shows a simplified timing diagram of the content displayed on the display device 146 of the multimedia information display device 140 according to one embodiment of the present disclosure. The operations of the multimedia system 100 are further explained below with reference to FIGS. 1~3.

In the operation 210, the multimedia information providing device 120 transmits one or more abstract information of the multimedia contents to the multimedia information display device 140. For example, the multimedia information providing device 120 may transmit one or more web pages comprising the abstract information of the multimedia contents. The abstract information may comprise at least one of a title, a thumbnail, a hyperlink, a description, and/or a song of the multimedia contents.

In the operation 220, the multimedia information display device 140 receives the abstract information of the multimedia contents transmitted from the multimedia information providing device 120 by utilizing the wireless communication device 142. The signal processing device 148 configures the display device 146 to display one or more guide screens according to the abstract information of the multimedia contents received by the wireless communication device 142. The guide screen comprises at least part of the abstract information received by the wireless communication device 142. For example, the display device 146 may display a guide screen comprising one or more abstract information. Thus, the user may browse through the abstract information of the multimedia contents from the guide screen and select the multimedia content which they are interested in.

In the operation 230, the multimedia information display device 140 receives the user's selection input signal(s) corresponding to the abstract information of the multimedia contents displayed on the display device 146 by utilizing the human machine interface device 144. Corresponding to the abstract information of the multimedia contents selected by the selection input signal(s), the signal processing device 148 configures the wireless communication device 142 to transmit one or more selection information to the multimedia information providing device 120 and/or the multimedia content providing device 160.

In the operation 240, the multimedia information providing device 120 configures the multimedia content providing device 160 to transmit a selected multimedia content to the multimedia information display device 140 according to the selection information transmitted from the wireless communication device 142. The selected multimedia content comprises a plurality of image frames.

In the operation 250, the multimedia information providing device 120 transmits one or more multimedia information related to the selected multimedia content to the multimedia information display device 140. The multimedia information display device 140 receives the multimedia information transmitted from the multimedia information providing device 120 by utilizing the wireless communication device 142.

In the operation 260, in a first interval, the signal processing device 148 of the multimedia information display device 140 configures the display device 146 to display a first screen. The first screen comprises a first image frame of the first multimedia content, one or more instances of the multimedia information, and a progress indicator. In the first interval, at least a first instance of the multimedia information displayed on the display device 146 is related to a first object of the first image frame. The first object comprises at least one of a character, an article, a sound, a scene, and a time of the first image frame. The first instance comprises one or more information fields related to the first object. The progress indicator is configured to operably indicate a first progress of displaying the first image frame. The progress indicator may be realized with any suitable format, e.g., minutes, seconds, and percentages. For example, the first image frame may be the image frame displayed at the fifth minute when playing the first multimedia content, or may be the image frame displayed at the 10% progress of the first multimedia content. Therefore, the progress indicator may respectively indicate 5 minute or 10% when displaying the first image frame. In the embodiment in FIG. 3, the display device 146 displays a first screen comprising a first image frame 311, instances 312, 313, and 314 related to an object of the first image frame, and a progress indicator 319 in the first interval T1.

In the operation 270, in a second interval, the signal processing device 148 of the multimedia information display device 140 configures the display device 146 to display a second screen. The second screen comprises a second image frame of the first multimedia content, one or more instances of the multimedia information, and a progress indicator. In the second interval, at least a second instance of the multimedia information displayed on the display device 146 is related to a second object of the second image frame. The second object comprises at least one of a character, an article, a sound, a scene, and a time of the second image frame. The second instance comprises one or more information fields related to the second object. The progress indicator indicates a second progress of displaying the second image frame. In the embodiment in FIG. 3, the display device 146 displays a second screen comprising a second image frame 321, instances 322 and 323 related to the second image frame 321, and a progress indicator 329 in the second interval T2.

In the embodiment in FIG. 2, the operations may be performed in other suitable orders according to different design considerations. For example, the operations 240 and 250 may also be performed at the same time, or the operation 250 may be performed before the operation 240.

In the above and the following embodiments, the multimedia content and the multimedia information may be connected according to the displaying progress code. The displaying progress code may be recorded as minutes, seconds, percentage, or other suitable format to indicate the time at which the image frame or the instance should be displayed. For example, in the embodiment in FIG. 3, the signal process device 148 configures the display device 146 to display the first image frame 311 in the first interval T1 according to the displaying progress code of the first image frame 311. The display time information field of the instance 312 related to the first image frame 311 is also configured to be corresponding to the displaying progress code of the first image frame 311. Therefore, the multimedia content and the related multimedia information may be properly shown on the displayed device 146.

In the above embodiments, the multimedia information comprises one or more instances. An instance comprises one or more information fields for storing the information related to an object of an image frame of the multimedia content. For example, the instance may be related to at least one of a character, an article, a sound, a scene and a time of an image frame of the multimedia content. When the objects are demonstrated by the multimedia information display device 140, the information in the information fields of the instances related to the object may be displayed on the display device 146 correspondingly.

When an object is demonstrated by the multimedia information display device 140, the related instance(s) must be displayed on the display device 146 at the proper time. In one embodiment, the instance comprises a displaying time information field for storing the displaying progress code of the corresponding image frame. The multimedia information display device 140 may synchronously display the multimedia content and the instance of the related multimedia information according to the displaying time information field of the instance. The displaying time information field of the instance may be expressed in any suitable format. For example, the instance may comprises one or more information fields for storing the beginning of the displaying time, the end of the displaying time, the length of the displaying time, and/or other suitable displaying time code.

The instance may comprises any suitable information field, e.g., the information fields for storing the title, the attribute, the description, the user evaluation, the hyperlink, the publish time, the modified time, the priority of the object of the image frame of the multimedia content. The signal processing device 148 may configure the display device 146 to display one or more information fields of the instance(s) according to the configuration of the multimedia information and/or the configuration of the user. For example, the signal processing device 148 may configure the display device 146 to display only the information fields of the instances which the user is interested in.

Moreover, the multimedia information may comprise one or more stories comprising one or more instances related to a specific topic. The story may comprise the story title, the story description, the identification code, and/or the aforementioned information fields of the instances so as to be browsed and selected by the users.

The multimedia publishers, the channel providers, the promoters of the performers, the marketing companies, or other multimedia information providers may edit the instances in advance and combine the instances into the required story. For example, the multimedia information provider may collect the price, the size, the distributor information of the clothing appeared in the multimedia content, and compile a story related to the clothing of the multimedia content. The multimedia information provider may collect the geographic location, the web link, and the tourist information of the scenes appeared in the multimedia content, and compile a story related to the scenes of the multimedia content. The multimedia information provider may collect the background, the web link, the news, and the activities of the performers appeared in the multimedia content, and compile a story related to the performers of the multimedia content.

In the embodiment in FIG. 2, according to the displaying order of the first multimedia content, the signal processing device 148 configures the display device 146 to display the first image frame and the related multimedia information in the operation 260, and to display the second image frame and the related multimedia information in the operation 270.

In other embodiment, the multimedia information display device 140 may configure the display device 146 to display the image frame and related multimedia information selected by the user according to the configuration of the user. For example, when the human machine interface device 144 receives one or more input signals from the user, the signal processing device 148 may configure the display device 146 to display a third screen in a third interval. The third screen comprises a third image frame of the first multimedia content, one or more instances of the multimedia information, and the progress indicator. Moreover, at least a third instance of the multimedia content is related to a third object of the third image frame. The third instance comprises one or more information fields related to the third object. The third object comprises at least one of a character, an article, a sound, a scene, and a time of the third image frame. In the third interval, the progress indicator indicates a third progress of displaying the third image frame.

In the above embodiments, the signal processing device 148 may configure the display device 146 to display the required content according to the input signals received by the human machine interface device 144. For example, in one embodiment, the progress indicator displayed on the display device display device 146 comprises a rectangular area and a cursor. The position of cursor in the rectangular area indicates the displaying progress of the first image frame currently displayed on the display device 146. When the human machine interface device 144 receives a click input signal in the rectangular area, a move input signal on the cursor (e.g., dragging the cursor), the input signal of entering a time code, or other input signal for adjusting the displaying progress, the signal processing device 148 configures the display device 146 to display the third image frame of the first multimedia content, one or more instances of the multimedia information related to the object of the third image frame, and the progress indicator indicating the third progress of displaying the third image frame.

In the above embodiment, the signal processing device 148 may configure the display device 146 to display the required content according to a combination of input signals received by the human machine interface device 144. For example, when the human machine interface device 144 receives a click input signal and a move input signal in a predetermined time period, the signal processing device 148 configures the display device 146 to display the require content according to the moving direction of the move input signal, the moving length of the move input signal, and/or the pressure of the click input operation. In one embodiment, when the moving direction of the move input operation is parallel to the progress indicator in the first interval, the signal processing device 148 configures the display device 146 to display the third image frame of the first multimedia content, one or more instances related to the object of the third image frame of the first multimedia content, and the progress indicator indicating the third progress of displaying the third image frame of the first multimedia content in the third interval. Moreover, when the moving direction of the move input operation is vertical to the progress indicator in the first interval, the signal processing device 148 configures the display device 146 to display a fourth image frame of a second multimedia content, one or more instances related to the object of the fourth image frame of the second multimedia content, and the progress indicator indicating the fourth progress of displaying the fourth image frame of the second multimedia content in the third interval.

In another embodiment, when the moving direction of the move input operation is parallel to the progress indicator in the first interval, the signal processing device 148 configures the display device 146 to display the third image frame of the first multimedia content, one or more instances related to the object of the third image frame of the first multimedia content, and the progress indicator indicating the third progress of displaying the third image frame of the first multimedia content in the third interval. Moreover, when the moving direction of the move input operation is vertical to the progress indicator in the first interval, the signal processing device 148 configures the display device 146 to display the first image frame of the first multimedia content, a fourth instance related to the object of the first image frame of the first multimedia content, and the progress indicator indicating the first progress of displaying the first image frame of the first multimedia content in the third interval. The fourth instance comprises one or more information fields related to a fourth object of the first image frame. The fourth object comprises at least one of a character, an article, a sound, a scene, and a time of the first image frame.

In some embodiments, the display device 146 displays one or more function input areas (e.g., a button, a scroll bar, and a wheel) for adjusting the displaying progress of the multimedia content and/or the multimedia information. When the human machine interface device 144 receives the click input signal, the slide input signal, the move input signal, the drag input signal, etc. corresponding to the function input area, the signal processing device 148 configures the display device 146 to display the third image frame of the first multimedia content, one or more instances of the multimedia information related to the object of the third image frame of the first multimedia content, and the progress indicator indicating the third progress of displaying the third image frame of the first multimedia content. For example, in one embodiment, the display device 146 displays a "forward" button and a "backward" button. When the human machine interface device 144 receives a click input signal on the "forward" button in the first interval, the signal processing device 148 configures the display device 146 to display the third image frame of the first multimedia content, one or more instances of the multimedia information related to the object of the third image frame of the first multimedia content, and the progress indicator indicating the third progress of displaying the third image frame of the first multimedia content in the third interval. Moreover, when the human machine interface device 144 receives a click input signal on the "backward" button in the third interval, the signal processing device 148 configures the display device 146 to display the first image frame of the first multimedia content, one or more instances of the multimedia information related to the object of the first image frame of the first multimedia content, and the progress indicator indicating the first progress of displaying the first image frame of the first multimedia content.

In another embodiment, the display device 146 displays a "forward" button and a "backward" button. When the human machine interface device 144 receives a click input signal on the "forward" button in the first interval, the signal processing device 148 configures the display device 146 to display the first image frame of the first multimedia content, to update the instance(s) of the multimedia information related to the object of the first image frame, and to display the progress indicator indicating the first progress of displaying the first image frame. Moreover, when the human machine interface device 144 receives a click input signal on the "backward" button in the first interval, the signal processing device 148 configures the display device 146 to display the first image frame of the first multimedia content, previously presented instance(s) of the multimedia information related to the object of the first image frame of the first multimedia content, and the progress indicator indicating the first progress of displaying the first image frame of the first multimedia content.

In the above embodiments, when the first object of the first image frame still exists in the second image frame in the second interval, the signal processing device 148 configures the display device 146 to display the first instance (which is related to the object of the first image frame) and the second instance (which is related to the object of the second image frame) in the second interval.

In another embodiment, the first instance, the second instance, and the fourth instance mentioned above respective comprise one or more displaying time information field. When the display device 146 is unable to display all of the first instance, the second instance, and the fourth instance at the same time, the signal processing device 148 determines one or more instances of the first instance, the second instance, and the fourth instance to be displayed on the display device 146 according to the displaying time information fields of the first instance, the second instance, and the fourth instance. For example, in one embodiment, the display device 146 is able to display only two instances at the same time. When the values in the beginning of the displaying time information fields of the second instance and the fourth instance are later than the value in the beginning of the displaying time information field of the first instance, the signal processing device 148 configures the display device 146 to display the second instance and the fourth instance with latest display times.

In another embodiment, the first instance, the second instance, and the fourth instance mentioned above respective comprise one or more priority information field. When the display device 146 is unable to display all of the first instance, the second instance, and the fourth instance at the same time, the signal processing device 148 determines one or more instances of the first instance, the second instance, and the fourth instance to be displayed on the display device 146 according to the priority information fields of the first instance, the second instance, and the fourth instance. For example, in one embodiment, the display device 146 is able to display only two instances at the same time. When the values in the priority information fields of the first instance and the second instance are greater than the value in the priority information field of the fourth instance, the signal processing device 148 configures the display device 146 to display the first instance and the second instance with higher priorities.

In the above embodiment, when the display device 146 is unable to display the first instance, the second instance, and the fourth instance in the same display style at the same time, the signal processing device 148 may configure the display styles of the first instance, the second instance, and the fourth instance to be displayed differently on the display device 146 according to the priority information fields, the displaying time information fields, the user preference information field, the user evaluation information fields, etc. of the first instance, the second instance, and the fourth instance. For example, in one embodiment, the signal processing device 148 configures the display device 146 to display the first instance, the second instance, and the fourth instances respectively with designated positions, dimensions, colors, shapes, and/or fonts.

In another embodiment, when the human machine interface device 144 receives the input signals corresponding to the area displaying instances on the display device 146, the signal processing device 148 configures the display device 146 to display the information field(s) of the selected instance with at least one of the position, the dimension, the color, the shape, and/or the font to be different from the unselected instance.

In the above embodiments, when the human machine interface device 144 does not receive one or more input signal in a predetermined period, the signal processing device 148 configures the first display device 146 not to display the progress indicator so as to improve the user's viewing quality.

Figure 4:
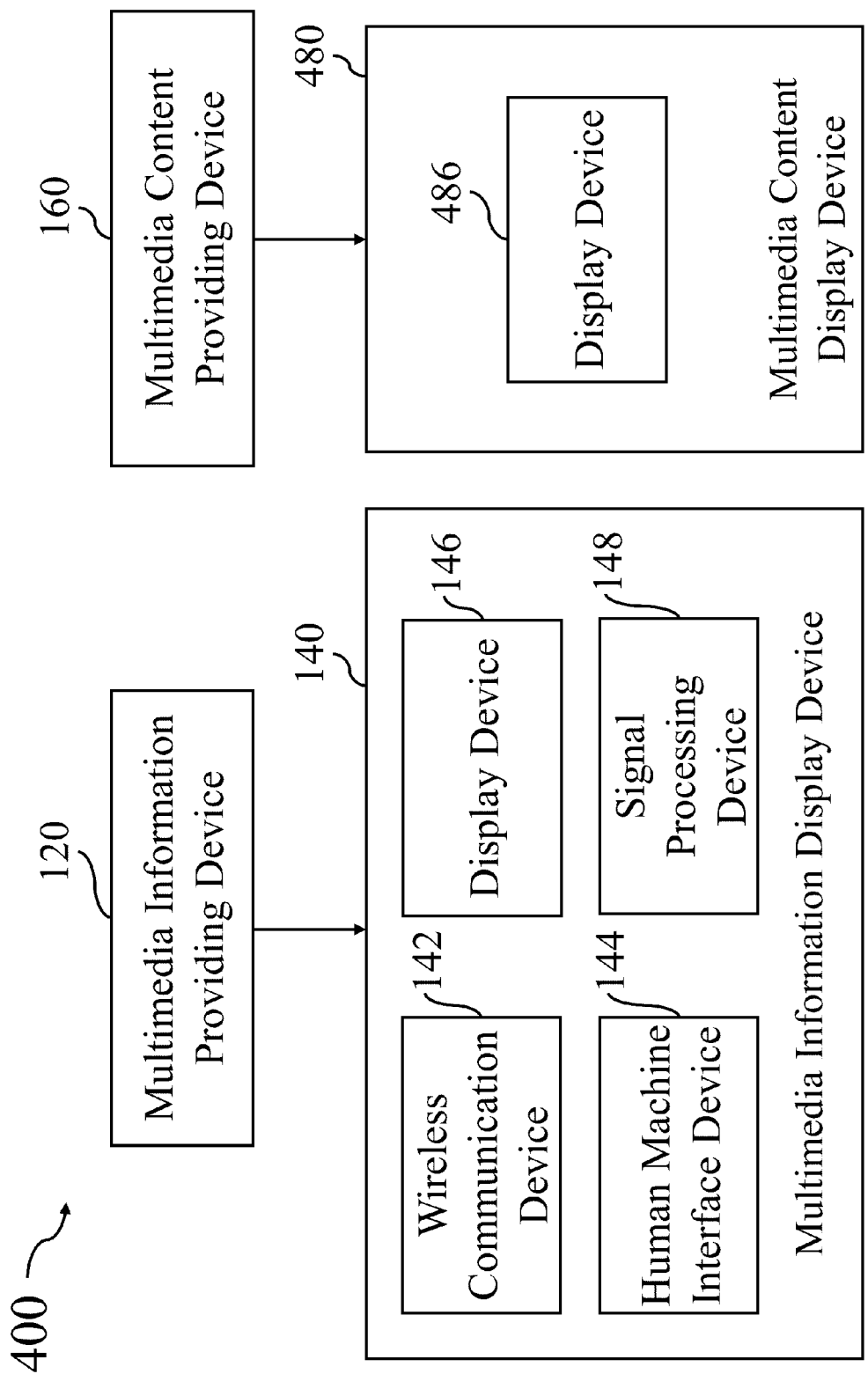
FIG. 4 shows a simplified functional block diagram of a multimedia system according to another embodiment of the present disclosure.

The multimedia information display device 140 may cooperate with other multimedia devices to perform varieties of functions. For example, FIG. 4 shows a simplified functional block diagram of a multimedia system 400 according to another embodiment of the present disclosure. The multimedia system 400 comprises the multimedia information providing device 120, the multimedia information display device 140, the multimedia content providing device 160, and a multimedia content display device 480.

The multimedia information providing device 120, the multimedia information display device 140, and the multimedia content providing device 160 may be realized similar to or the same as the embodiments described above.

The multimedia content display device 480 comprises a display device 486 for displaying the multimedia content. For example, the multimedia content device 480 may be realized with a television, a projector, a computer, etc. for providing the multimedia content to the user.

The user may configure the multimedia content display device 480 to display the multimedia content by utilizing the human machine interface device 144. The signal processing device 148 may configure the display device 146 to display only the multimedia information and the progress indicator. In one embodiment, in the fifth interval, the display device 486 of the multimedia content display device 480 displays a fifth image frame of the first multimedia content, and the signal processing device 148 of the multimedia information display device 140 configures the display device 146 of the multimedia information display device 140 to display one or more instances of the multimedia information related to the object of the fifth image frame. At least a fifth instance of the multimedia information is related to a fifth object of the fifth image frame. The fifth instance comprises one or more information fields related to the fifth object of the fifth image frame, and the fifth object comprises at least one of a character, an article, a sound, a scene, and a time of the fifth image frame. The progress indicator may be displayed on the display device 146 or on the display device 486 for indicating a fifth progress of displaying the fifth image frame of the first multimedia content in the fifth interval.

In another embodiment, the signal processing device 148 may configure the display device 146 to display the multimedia content, the multimedia information and the progress indicator. Moreover, the display device 146 and the display device 486 may display substantially the same content of an image frame of a multimedia content. For example, the display device 146 and the display device 486 may simultaneously display the content of the first image frame of the first multimedia content, but the dimensions and/or the resolutions of the display device 146 and the display device 486 are different.

In the embodiments above, the multimedia information display device 140 may receive the multimedia content through any suitable approach. For example, the multimedia information providing device 120 may configure the multimedia content providing device 160 to directly transmit the multimedia content to the multimedia information display device 140. In another embodiment, the multimedia information display device 140 receives the abstract information of the multimedia contents from the multimedia information providing device 120 and requests the multimedia content providing device 160 to transmit the multimedia content.

Moreover, the multimedia content display device 480 may receive the multimedia content through any suitable approach. For example, when the multimedia information display device 140 receives the user's input signal, the multimedia information display device 140 configures the multimedia content display device 480 to request and receive the required multimedia content from the multimedia content providing device 160. In another embodiment, when multimedia information display device 140 receives the user's input signal, the multimedia information display device 140 configures the multimedia content providing device 160 to transmit the multimedia content to the multimedia content display device 480. In another embodiment, the multimedia information display device 140 receives the multimedia content from the multimedia content providing device 160 and transmits the received multimedia content to the multimedia content display device 480.

Figure 5:
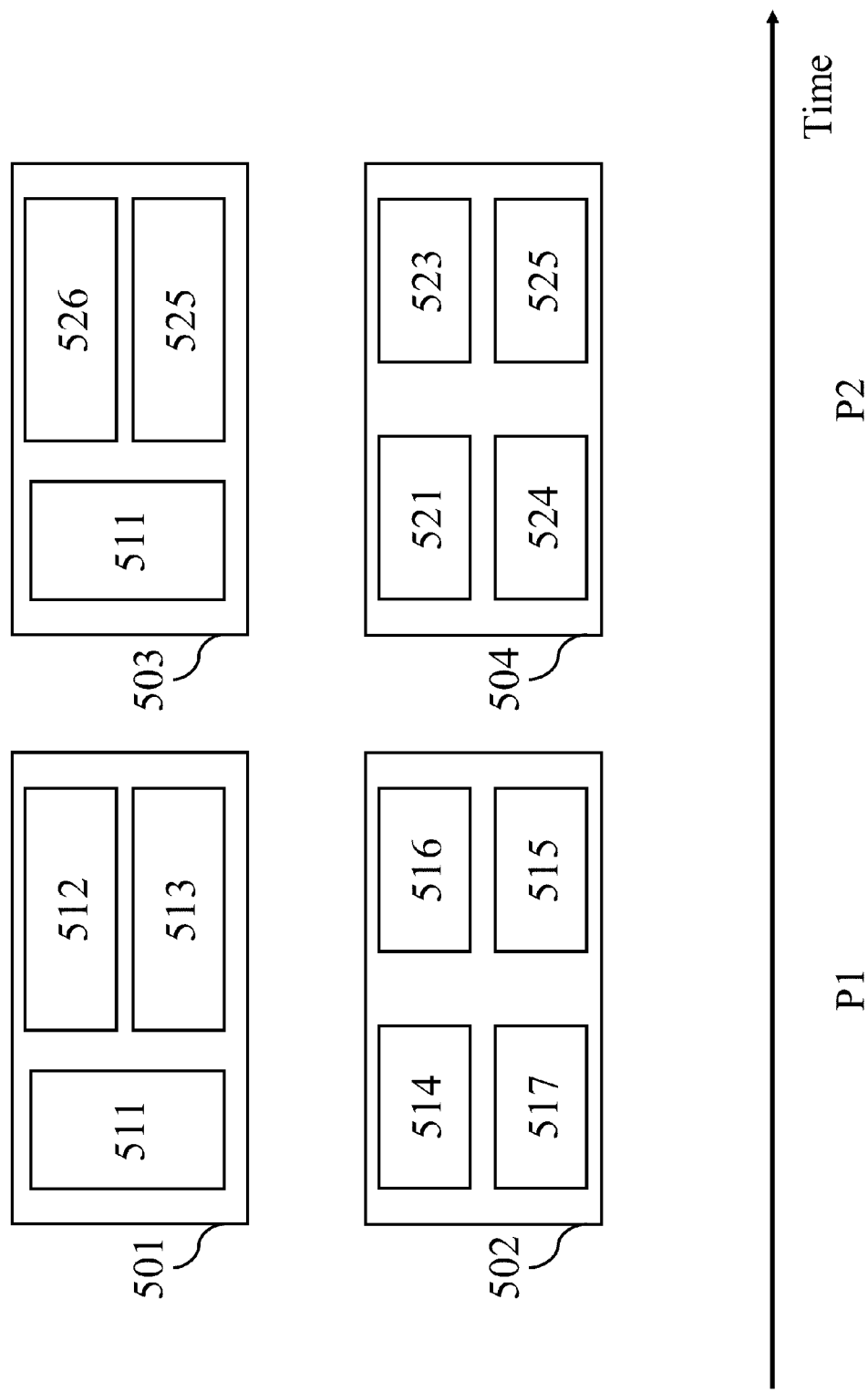
FIG. 5 shows a simplified timing diagram of the content displayed on the multimedia information display device according to another embodiment of the present disclosure.

FIG. 5 shows a simplified timing diagram of the content displayed on the display device 146 according to another embodiment of the present disclosure. In the embodiment in FIG. 5, in the interval P1, the signal processing device 148 configures the display device 146 to display a screen 501 comprising one or more information fields of the instances 511, 512, and 513 according to the priority information fields and/or displaying time information fields of the instances. The user may input the click input signal, the move input signal, etc. through the human machine interface device 144, and accordingly the signal processing device 148 configures the display device 146 to display a screen 502 comprising one or more information fields of the instances 514, 515, 516, and 517 with lower priorities.

In the interval P2, the signal processing device 148 configures the display device 146 to display a screen 503 comprising one or more information fields of the instances 511, 525, and 526 according to the priority information fields and/or displaying time information fields of the instances. In the interval P2, the instances 512-515 are not needed to be shown. Moreover, a screen 504 comprising the instances 521-524 with lower priorities may be shown on the display device 146 according to the input signal(s) received by the human machine interface device 144.

In the above embodiments, the human machine interface device 144 may comprises a mouse, a touchpad, an image capturing device, a voice input device, etc. to receive the click input signal, the move input signal, the selection input signal, the drag input signal, etc.

In the above embodiments, the multimedia information providers may simultaneously transmit one or more stories related to the multimedia content by utilizing the multimedia information providing device 120. The stories may be categorized so that the user of the multimedia information display device 140 may browse through the story titles, the story descriptions, the identification codes, or other information fields of the stories and easily select the stories which they are interested in. For example, in one embodiment, the user may select the multimedia information only related to the clothing, and hide other kinds of multimedia information. Furthermore, the user may perform searches on the information fields of the instances so as to obtain the required multimedia contents quickly. For example, the signal processing device 148 may configure the display device 146 to display one or more information fields of the instances. Thus, the user may filter the multimedia contents according the score of the user evaluation information field and/or other information fields. The signal processing device 148 may also store the user's previous selection criteria, and the user may filter the multimedia content according to the stored selection criteria. Therefore, the user may obtain the required multimedia contents and the related multimedia information accurately and quickly according to the information fields of the stories and the instances.

In the above embodiments, the multimedia information display device may display the multimedia information related to the simultaneously displayed multimedia content. Therefore, the user may obtain the required multimedia information instantly and accurately without deteriorating the view quality.

Moreover, the multimedia information providers may accurately gather statistics of the users' requirements and preferences according to the information fields of the stories and the instances. The viewers may also receive the multimedia information which they are really interested in according their preferences. Therefore, the multimedia information may be delivered to the target audience, and the viewers may still maintain the viewing quality.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

The same reference numbers may be used throughout the drawings to refer to the same or like parts, components, or operations. Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to" Also, the phrase "coupled with" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a", "an", and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multimedia information display device, comprising:
a first display device;
a human machine interface device;
a wireless communication device, configured to operably receive a multimedia content and a multimedia information, wherein the multimedia content comprises a plurality of image frames, and the multimedia information comprises a plurality of instances; and a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame;

wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame; when the human machine interface device receives one or more input signals in the first interval, the signal processing device configures the first display device to display the first image frame of the multimedia content, a third instance of the multimedia information, and the progress indicator indicating the first progress of displaying the first image frame in a third interval according to the one or more input signals; and the third instance comprises one or more information fields related to a third object of the first image frame, and the third object comprises at least one of a character, an article, a sound, a scene, and a time of the first image frame; the one or more input signals comprise at least one of a click input signal and a move input signal performed on the human machine interface device when the first display device displays the first image frame, the first instance, and the progress indicator in the first interval, and wherein when a direction of the move input signal is parallel to the progress indicator in the first interval, the signal progress device configures the first display device to display a third image frame of the multimedia content, a fourth instance of the multimedia information, and the progress indicator indicating a third progress of displaying the third image frame; the fourth instance comprises one or more information fields related to a fourth object of the third image frame, and the fourth object comprises at least one of a character, an article, a sound, a scene, and a time of the third image frame; and when the direction of the move input signal is vertical to the progress indicator in the first interval, the signal progress device configures the first display device to display the first image frame of the multimedia content, the third instance of the multimedia information, and the progress indicator indicating the first progress of displaying the first image frame.

2. The multimedia information display device of claim 1, wherein the one or more input signals comprise a click input signal performed on the progress indicator displayed on the first display device.

3. The multimedia information display device of claim 1, wherein the one or more input signals comprise at least one of a click input signal, a slide input signal, and a move input signal performed on the human input interface device corresponding to a function input area displayed on the first display device.

4. The multimedia information display device of claim 1, wherein the one or more input signals comprise a drag input signal performed on the progress indicator displayed on the first display device.

5. The multimedia information display device of claim 1, wherein when the second image frame comprises the first object, the signal progress device configures the first display device to display the first instance and the second instance.

6. The multimedia information display device of claim 1, wherein when the human machine interface device receives a selection input signal corresponding to the third instance, the signal processing device configures the first display device to change at least one of a position, a dimension, a color, a shape, and a font of the third instance.

7. A multimedia information display device, comprising:
a first display device;
a wireless communication device, configured to operably receive a multimedia content and a multimedia information, wherein the multimedia content comprises a plurality of image frames, and the multimedia information comprises a plurality of instances; and
a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame;
wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame, and
wherein the multimedia information further comprises a fourth instance; the fourth instance comprises one or more information fields related to a fourth object of the second image frame, and the fourth object comprises at least one of the character, the article, the sound, the scene, and the time of the second image frame; the first instance, the second instance, and the fourth instance respectively comprise a priority information field; and when the first display device is unable to display the first instance, the second instance, and the fourth instance at the same time, the signal progressing device configures the first display device to display the instances with higher priorities according to the priority information fields of the first instance, the second instance, and the fourth instance.

8. A multimedia information display device, comprising:
a first display device;
a wireless communication device, configured to operably receive a multimedia content and a multimedia information, wherein the multimedia content comprises a plurality of image frames, and the multimedia information comprises a plurality of instances; and
a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame;

wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame, and wherein the multimedia information further comprises a fourth instance; the fourth instance comprises one or more information fields related to a fourth object of the second image frame, and the fourth object comprises at least one of the character, the article, the sound, the scene, and the time of the second image frame; the first instance, the second instance, and the fourth instance respectively comprise a displaying time information field; and when the first display device is unable to display the first instance, the second instance, and the fourth instance at the same time, the signal progressing device configures the first display device to display the instances with latest display times according to the displaying time information fields of the first instance, the second instance, and the fourth instance.

9. A multimedia information display device, comprising:
a first display device;
a wireless communication device, configured to operably receive a multimedia content and a multimedia information, wherein the multimedia content comprises a plurality of image frames, and the multimedia information comprises a plurality of instances; and
a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame;
wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame, and
wherein the signal processing device configures a second display device to display a fifth image frame of the multimedia content through the wireless communication device, and configures the first display device to display a fifth instance of the multimedia information; and the fifth instance comprises one or more information fields related to a fifth object of the fifth image frame, and the fifth object comprises at least one of a character, an article, a sound, a scene, and a time of the fifth image frame.

10. The multimedia information display device of claim 9, wherein the fifth image frame is substantially the same as at least one of the first image frame and the second image frame.

11. The multimedia information display device of claim 9, wherein the signal processing device configures the first display device to display the progress indicator indicating a fifth progress of displaying the fifth image frame.

12. A multimedia information display device, comprising:
a first display device;
a human machine interface device;
a wireless communication device, configured to operably receive a multimedia content and a multimedia information, wherein the multimedia content comprises a plurality of image frames, and the multimedia information comprises a plurality of instances; and
a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame;
wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame; wherein when the human machine interface device receives one or more input signals in the first interval, the signal processing device configures the first display device to display the first image frame of the multimedia content, a third instance of the multimedia information and the progress indicator indicating the first progress of displaying the first image frame in a third interval according to the one or more input signals; and the third instance comprises one or more information fields related to a third object of the first image frame, and the third object comprises at least one of a character, an article, a sound, a scene, and a time of the first image frame, and
wherein when the human machine interface device does not receive the one or more input signals in a predetermined period, the signal processing device configures the first display device not to display the progress indicator.

13. A multimedia information display device, comprising:
a first display device;
a human machine interface device;
a wireless communication device, configured to operably receive a multimedia content and a multimedia information, wherein the multimedia content comprises a plurality of image frames, and the multimedia information comprises a plurality of instances; and
a signal processing device, in a first interval, configuring the first display device to display a first image frame of the multimedia content, a first instance of the multimedia information, and a progress indicator indicating a first progress of displaying the first image frame; and in a second interval, configuring the first display device to display a second image frame of the multimedia content, a second instance of the multimedia information, and the progress indicator indicating a second progress of displaying the second image frame;

wherein the first instance comprises one or more information fields related to a first object of the first image frame, and the first object comprises at least one of a character, an article, a sound, a scene, and a time of the first image frame; and the second instance comprises one or more information fields related to a second object of the second image frame, and the second object comprises at least one of a character, an article, a sound, a scene, and a time of the second image frame; when the human machine interface device receives one or more input signals in the first interval, the signal processing device configures the first display device to display a third image frame of the multimedia content, a third instance of the multimedia information, and the progress indicator indicating a third progress of displaying the third image frame in a third interval according to the one or more input signals; and the third instance comprises one or more information fields related to a third object of the third image frame, and the third object comprises at least one of a character, an article, a sound, a scene, and a time of the third image frame; the one or more input signals comprises at least one of a click input signal and a move input signal performed on the human machine interface device when the first display device displays the first image frame, the first instance, and the progress indicator in the first interval, and wherein when a direction of the move input signal is parallel to the progress indicator in the first interval, the signal processing device configures the first display device to display the third image frame of the multimedia content, the third instance of the multimedia information, and the progress indicator indicating the third progress of displaying the third image frame; when the direction of the move is vertical to the progress indicator, the signal processing device configures the first display device to display the first image frame of the multimedia content, a fourth instance of the multimedia information, and the progress indicator indicating the first progress of displaying the first image frame; and the fourth instance comprises one or more information fields related to a fourth object of the first image frame, and the fourth object comprises at least one of the character, the article, the sound, the scene, and the time of the first image frame.

* * * * *